United States Patent [19]

Fonseca

[11] Patent Number: 5,536,353
[45] Date of Patent: Jul. 16, 1996

[54] METHOD AND APPARATUS FOR FORMING INSPECTION OPENINGS IN INSULATION CLADDING

[76] Inventor: Roberto Fonseca, 3205 Los Feliz Blvd., Bldg. 4, Unit 102, Los Angeles, Calif. 90039

[21] Appl. No.: 373,848

[22] Filed: Jan. 18, 1995

[51] Int. Cl.⁶ .................................................. F16L 55/00
[52] U.S. Cl. ........................ 156/257; 156/294; 156/71; 156/253; 138/89; 138/90; 138/92; 138/94
[58] Field of Search .................................. 156/257, 247, 156/256, 152, 71, 294, 252, 253, 91; 138/36, 89, 90, 92, 94, DIG. 1, DIG. 6, 137, 140, 149; 220/359, 676

[56] References Cited

U.S. PATENT DOCUMENTS

| | | | |
|---|---|---|---|
| 743,269 | 11/1903 | Godin | 138/89 |
| 3,658,096 | 4/1972 | Higuera | 138/90 |
| 3,756,287 | 9/1973 | Bishop | 138/92 |
| 3,827,462 | 8/1974 | Celesta | 138/90 |
| 4,091,842 | 5/1978 | Greenawalt et al. | 138/90 |
| 5,010,926 | 4/1991 | Kurth et al. | 138/149 |
| 5,014,866 | 5/1991 | Moore | 215/364 |
| 5,287,892 | 2/1994 | Sanderson et al. | 138/92 |
| 5,351,718 | 10/1994 | Barton | 138/92 |

*Primary Examiner*—David A. Simmons
*Assistant Examiner*—Linda L. Gray
*Attorney, Agent, or Firm*—I. M. Bak-Boychuk

[57] ABSTRACT

A method and apparatus for forming inspection apertures through the insulation cladding of a containment vessel by forming an opening partly through the cladding which is thereafter lined by an adhered liner. The depth of the liner is less than the thickness of the cladding, thereby precluding heat transfer thereacross. The removed plug of the insulation is then fixed by an adhesive spray about its exterior, and once cured can then be replaced into the liner to recreate substantially identical insulative qualities. On replacement, a bridging cover is adhered across the liner to maintain the weather integrity of the cladding. This cover may be removed on successive occassions to allow for repeated inspection of the vessel walls.

4 Claims, 2 Drawing Sheets

METHOD AND APPARATUS FOR FORMING INSPECTION OPENINGS IN INSULATION CLADDING

BACKGROUND TO THE INVENTION

1. Field of the Invention

The present invention relates to inspection apertures in insulation cladding, and more particularly to a method and structure for forming same.

2. Description of the Prior Art

Containment vessels of various forms are frequently provided with insulation cladding, leaving the containment structure obscured. As a result no inspection is possible of the integrity of the vessel walls, and corrosion and other structural deterioration is often not detectable at all. In the past various opening techniques have been devised through the insulation cladding to expose the vessel for inspection.

One prior art technique for vessel inspection access is described in U.S. Pat. No. 5,010,926 issued to Kurth et al, on Apr. 30, 1991. While suitable for the purposes intended, the foregoing structure allows for some insulation coefficient differential and there is therefore a consequent incidence of condensation, incurring an increased possibility of corrosion at the aperture itself. As result, the inspection access is not indicative of the overall state of the vessel, increasing the possibility of an unnecessary repair procedure.

For these reasons, it is preferrable to match the insulation characteristics of the inspection aperture with those of the cladding itself and to minimize all potential vapor migration to the vessel wall through the inspection cutout. One technique for effecting these objectives is described herein.

SUMMARY OF THE INVENTION

Accordingly, it is the general purpose and object of the present invention to provide a method and structure for effecting inspection that retains the integrity of the insulation cladding.

Other objects of the invention are to provide a method for forming inspection apertures in insulation structures surrounding containment vessels which are substantially like the insulation cladding itself.

Further objects of the invention are to provide a technique for forming inspection apertures in insulation cladding conformed for repetitive access and for cladding integrity between inspection events.

Yet further objects of the invention are to effect inspection access through insulation cladding which is easily performed in the field, and which retains the integrity of the cladding between inspections.

Briefly, these and other objects are accomplished in the present invention by way of a sequence of steps, commenced by a hole cut partially through the cladding that leaves the interior part of the insulation uncut. The partial cladding plug is then removed, exposing the inner layer for stripping, and once stripped the vessel wall is then accessible for inspection. The exterior surface of the partial plug is then fixed at the cut, thus retaining its shape from disintegration, and by retaining its original structure is then replaceable into the opening following inspection.

To protect the exposed cut surfaces of the cladding surrounding the opening, a tubular liner is then inserted into the opening extending to the depth of the cut. This liner is provided with an annular lip at the exposed end, overlying the exterior layer of the cladding upon insertion. In this form convenient depth dimension may be easily effected in the field by the simple expedient of a cut. To select this dimension, the operator sets the depth setting of the hole saw, which then forms the reference for the length of the liner.

Preferably, the liner is formed of a thin material structure, and is therefore conveniently cut by any conventional cutting tool. Thus the shaping of the aperture components can be done in the field, with minimal burden. The thin walled material structure of the liner, moreover, limits heat transfer across the cladding retaining the insulative qualities originally installed. To achieve a complete insulation match, the fixed plug structure is replaced in the liner, and the liner is then covered by a cover plate; the plate, the liner, and the plug being then adhesively fixed to prevent the tranfer of moisture.

By these steps a field technique is devised that limits direct heat transfer contact through the liner, and that also assures moisture integrity of the insulation.

DESCRIPTION OF THE PREFERRED EMBODIMENT

Figure 1:
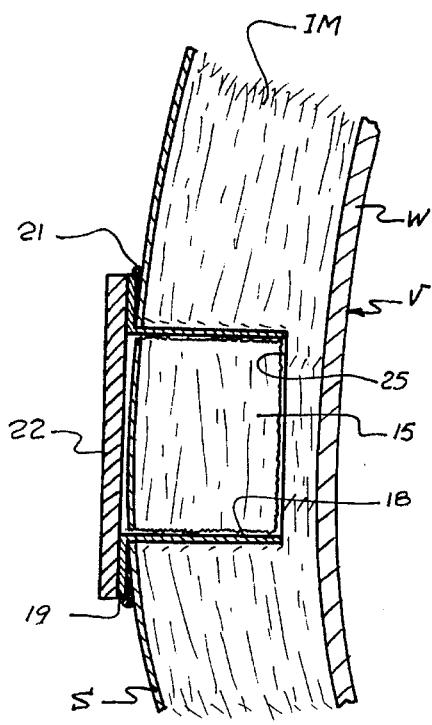
FIG. 1 is a sectional view of an inspection aperture effected in accordance with the inventive technique disclosed herein.

As shown in FIG. 1, a typical pressure vessel or containment vessel V includes containment walls W which, in the course of time suffer corrosion damage and damage through repeated stress. Both to protect the vessel V from environmental exposure and to maintain the temperature of the fluids in the vessel at some desired temperature, the vessel walls W are often covered by insulation cladding IC comprising a layer of insulating material IM covered on the exterior by an impervious skin S. While this structure is extensively practiced, and obtains the desired benefits in the course of use, one disadvantage thereof is the obscuring aspect of the cladding to any inspection of the vessel walls W. Simply, any inspection access through the cladding, of necessity, pierces the cladding and inspection access is therefore exchanged for integrity. For this reason various techniques have been devised in the past that attempt to minimize the invasive aspects of the inspection aperture. While suitable for the purposes intended, these techniques either entail complex fabrication of parts or allow some deterioration of the cladding.

The inspection access has now become particularly significant as the containment technology has matured. The original containment structures did not contemplate the life spans now in effect, and field installation of inspection apertures is now a common event. To render the foregoing field task particularly convenient, I have devised a technique that may be carried out in the field, and that also retains the original integrity of the cladding IC. I achieve this technique by cutting an opening 11 with the aid of a rotary hole cutter 12, the depth of the opening 11 being less than the thickness of the cladding IC. Thus an interior layer of insulation 14 is left in the opening 11 upon the withdrawal of the hole cutter 12, together with the cut plug 15 therein. Plug 15 is then withdrawn from the cutter and is sprayed about its exterior by a fixative mist, like a shellac spray 16, fixing the insulation strands from unraveling to form an integral plug structure. Thereafter, a thin-walled tubular liner 18 is cut to the length of the plug 15, liner 18 having the sectional dimensions of the hole cutter 12. Once cut to this length, liner 18 replaces the saw kerf of the cutter with a peripheral lip 19 on one end of the liner overlying the exterior skin S around the cut hole. To produce a weather impervious seal, the lip 19 may be bedded in a bead of adhesive 21 deposited on the adjacent skin which when cured fixes the liner in position.

In this form the liner can then receive the fixed plug 15, which on insertion restores the thermal transmission coefficients of the original cladding. Following plug replacement, a lid 22 may be adhered to lip 19, restoring the skin integrity of the cladding.

Figure 4:
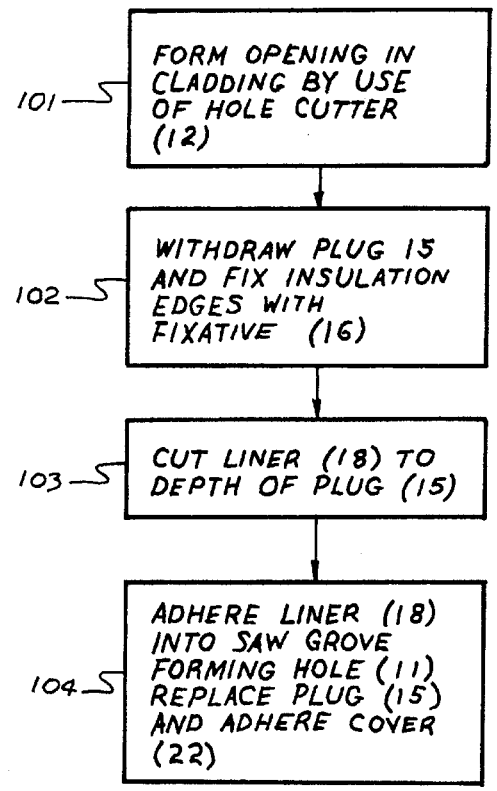
FIG. 4 is a flow chart of the sequence of steps in accordance with the present invention.
Figure 2:
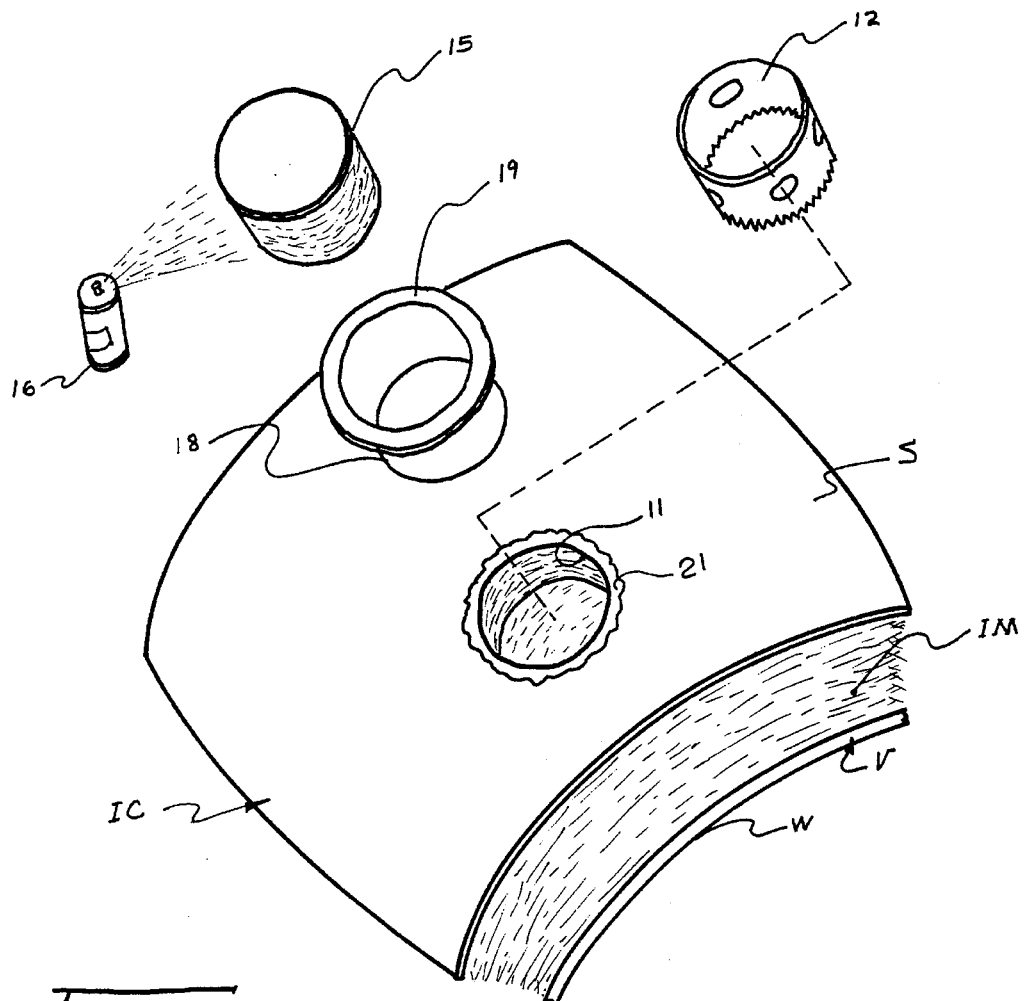
FIG. 2 is a perspective illustration, separated by parts, of the inventive installation sequence disclosed herein.
Figure 3:
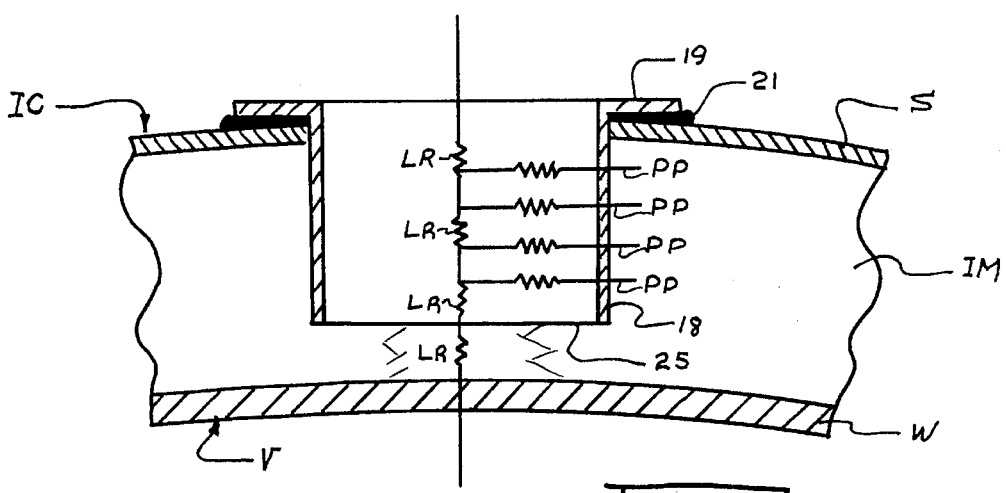
FIG. 3 is a thermal transfer diagram illustrating the heat tranfer paths effected by the present invention.

One will note that the foregoing sequence of steps, illustrated in FIGS. 2–4, results in minimal alteration of the original cladding characteristics. For example, the linear thermal resistance LR of the thin-walled liner 18 is effective mainly across the liner wall. Thus on replacement of the plug 15 only minimal thermal distortion results in the cladding. The same thin wall features of the liner, moreover, render any field cuts convenient, obtaining both convenience and the desired objective. Thus liner structures of 1.0 mm, or less, in thickness achieve the desired result, liner 18 serving primarily as a mechanism for retaining the integrity of the insulation.

The shortened dimension of the cut, and the length of the liner effect further a transmission gap between the liner and the wall W. The bottom layer of the insulation can simply be parted or removed for inspection, while providing a ledge or step 25 separating the liner from the wall. In this manner direct contact between the liner and the wall is precluded, directing the principal heat tranfer paths PP across the liner structure, a heat transfer path consistent with the function of the cladding.

By this sequence, comprising step 101 in which the opening is made by the hole cutter 12; step 102 in which the plug 15 is withdrawn and fixed; step 103 in which the length of liner 18 is cut to the length of plug 15; and step 104 in which the cut liner 18 is adhesively replaced into the saw kerf, an aperture is constructed in the field, both for immediate inspection and for inspections thereafter. These simple and convenient field steps, moreover, reproduce the original integrity of the cladding with tooling of common distribution.

Obviously many modifications and variations may be made without departing from the spirit of the above teachings. It is therefore intended that the scope of the instant invention be determined solely by the claims appended hereto.

What is claimed is:

1. A method for forming inspection apertures in the insulation cladding surrounding a containment vessel, said insulation cladding including a layer of insulation positioned on the walls of the vessel and an exterior skin covering said layer, comprising the steps of:

forming a cylindrical opening in said cladding using a hole cutter, said opening extending through said skin and partly through said insulation layer;

withdrawing said hole cutter together with a portion of said cladding received in said cutter and removing said portion therefrom where said portion has an exterior cut surface;

fixing the exterior cut surface of said portion with a fixative spray to secure the insulation layer of said portion from disintegration;

cutting an annular liner to have a length equal to the length of said portion and inserting said liner into said opening, said liner including an annular lip adhered to said skin surrounding said opening upon insertion of said liner; and replacing said portion into said liner.

2. A method according to claim 1, further comprising the step of:

covering said liner by adhering a circular cover to said annular lip.

3. A method according to claim 2, further comprising the step of:

removing any remaining parts of said insulation layer from said opening to expose said wall of said vessel for inspection.

4. A method according to claim 3, wherein said step of covering said liner including the further step of:

removably adhering a cover across said annular lip of said liner.

* * * * *